(12) United States Patent
Yamasaki et al.

(10) Patent No.: US 9,000,654 B2
(45) Date of Patent: Apr. 7, 2015

(54) ULTRASONIC MOTOR AND LENS DRIVING APPARATUS

(71) Applicant: Canon Kabushiki Kaisha, Tokyo (JP)

(72) Inventors: Ryo Yamasaki, Tokyo (JP); Makoto Oikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/751,906

(22) Filed: Jan. 28, 2013

(65) Prior Publication Data

US 2013/0193803 A1 Aug. 1, 2013

(30) Foreign Application Priority Data

Jan. 30, 2012 (JP) ................................ 2012-017136

(51) Int. Cl.
*H02N 2/10* (2006.01)
*H02N 2/00* (2006.01)
*G02B 7/04* (2006.01)

(52) U.S. Cl.
CPC .............. *H02N 2/0055* (2013.01); *H02N 2/103* (2013.01); *G02B 7/04* (2013.01); *H02N 2/0015* (2013.01)

(58) Field of Classification Search
CPC ..... H02N 2/026; H02N 2/028; H02N 2/0095; H02N 2/103
USPC ........................................ 310/323.09, 323.16
See application file for complete search history.

(56) References Cited

U.S. PATENT DOCUMENTS

| | | | |
|---|---|---|---|
| 6,657,362 B2 * | 12/2003 | Matsuo et al. ........... | 310/323.02 |
| 6,856,072 B2 * | 2/2005 | Kosaka et al. ........... | 310/323.02 |
| 7,242,131 B2 * | 7/2007 | Kishi et al. ............... | 310/323.02 |
| 7,732,983 B2 * | 6/2010 | Kasai ....................... | 310/323.17 |
| 8,063,537 B2 * | 11/2011 | Sakamoto ................ | 310/323.02 |
| 8,164,637 B2 * | 4/2012 | Kawai ........................ | 348/208.4 |
| 8,704,426 B2 * | 4/2014 | Kojima .................... | 310/323.16 |
| 2006/0113867 A1 * | 6/2006 | Sakatani et al. ......... | 310/323.17 |
| 2008/0174206 A1 * | 7/2008 | Sakamoto ................ | 310/323.09 |
| 2010/0141091 A1 * | 6/2010 | Sakamoto ................ | 310/323.16 |
| 2011/0095650 A1 | 4/2011 | Sakano | |
| 2013/0033152 A1 * | 2/2013 | Yamasaki et al. ........ | 310/323.02 |
| 2014/0152149 A1 * | 6/2014 | Kojima .................... | 310/323.16 |
| 2014/0300977 A1 * | 10/2014 | Yamasaki et al. ............. | 359/824 |

FOREIGN PATENT DOCUMENTS

| | | |
|---|---|---|
| CN | 101567644 A | 10/2009 |
| JP | H11-346486 A | 12/1999 |
| JP | 2004-304887 A | 10/2004 |
| JP | 4667839 B2 | 4/2011 |
| TW | M286995 U | 2/2006 |

* cited by examiner

*Primary Examiner* — J. San Martin
(74) *Attorney, Agent, or Firm* — Canon USA Inc. IP Division

(57) ABSTRACT

An ultrasonic motor includes a vibrator configured to generate an elliptical vibration, a driven member configured to be driven by the vibrator, wherein the driven member is driven according to the elliptical vibration of the vibrator, a holding unit configured to hold the vibrator, and a pressure unit configured to press the vibrator against the driven member, wherein the holding unit includes a first holding member configured to hold the vibrator, and a second holding member configured to press the vibrator against the driven member, and wherein the first holding member and the second holding member are relatively movable in a direction perpendicular to a contact surface of the driven member with the vibrator.

18 Claims, 7 Drawing Sheets

ULTRASONIC MOTOR AND LENS DRIVING APPARATUS

BACKGROUND OF THE INVENTION

1. Field of the Invention

The present invention relates to an ultrasonic motor configured to cause a vibrator to generate an elliptical vibration and drive the vibrator pressed against a driven member.

2. Description of the Related Art

Ultrasonic motors are characterized by, for example, a noiseless operation, the capability of driving an object at various speed levels from a low speed to a high speed, and an output of a high torque. To make full use of these characteristics, conventionally, the ultrasonic motors have been employed as, for example, driving sources of cameras and lenses. Japanese Patent No. 4667839 discusses an ultrasonic motor including an annular driven member having a rotational shaft and a plurality of vibrators. The vibrators are disposed on the annular driven member so as to be spaced apart at predetermined intervals while being pressed against the driven member in frictional contact with the driven member. When an ultrasonic vibration is excited at each of the vibrators in frictional contact with the driven member, an elliptical motion is generated at a portion of the vibrator that contacts the driven member, and the driven member is rotationally driven around the rotational shaft. The pressing force of the vibrator against the driven member is acquired by biasing a portion near a neutral axis of the vibrator, which corresponds to a vibration node set near a center of the vibrator, with a plate spring via a holder member and a pressing member. Then, this pressing force is adjusted with use of a screw and an adjustment washer disposed near a fixed portion of the plate spring.

However, a holding mechanism of the vibrator in the ultrasonic motor discussed in above-described Japanese Patent No. 4667839 is constituted by many components and has a complex structure. Especially, a support shaft should be located near the neutral axis of the vibrator to hold the vibrator in a stably pressed state against the driven member. There are a large number of components and assembling the components is complicated. Further, this ultrasonic motor uses a large piezoelectric element in the structure, and, therefore, causes an increase in cost.

SUMMARY OF THE INVENTION

The present invention is directed to an ultrasonic motor configured to drive a driven member by an elliptical vibration generated by a vibrator, and capable of stably pressing the vibrator against the driven member with a simple structure.

According to an aspect of the present invention, an ultrasonic motor includes a vibrator configured to generate an elliptical vibration, a driven member configured to be driven by the vibrator, wherein the driven member is driven according to the elliptical vibration of the vibrator, a holding unit configured to hold the vibrator, and a pressure unit configured to press the vibrator against the driven member, wherein the holding unit includes a first holding member configured to hold the vibrator, and a second holding member configured to press the vibrator against the driven member, and wherein the first holding member and the second holding member are relatively movable in a direction perpendicular to a contact surface of the driven member with the vibrator.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Exemplary embodiments for carrying out the present invention will be described below as a first exemplary embodiment and a second exemplary embodiment.

In the following description, the first exemplary embodiment of the present invention will be described with reference to FIGS. 1 to 5. An ultrasonic motor according to the present exemplary embodiment is an example of a rotation driving-type motor unitized as an actuator for driving, for example, a lens barrel for a digital camera.

Figure 1:
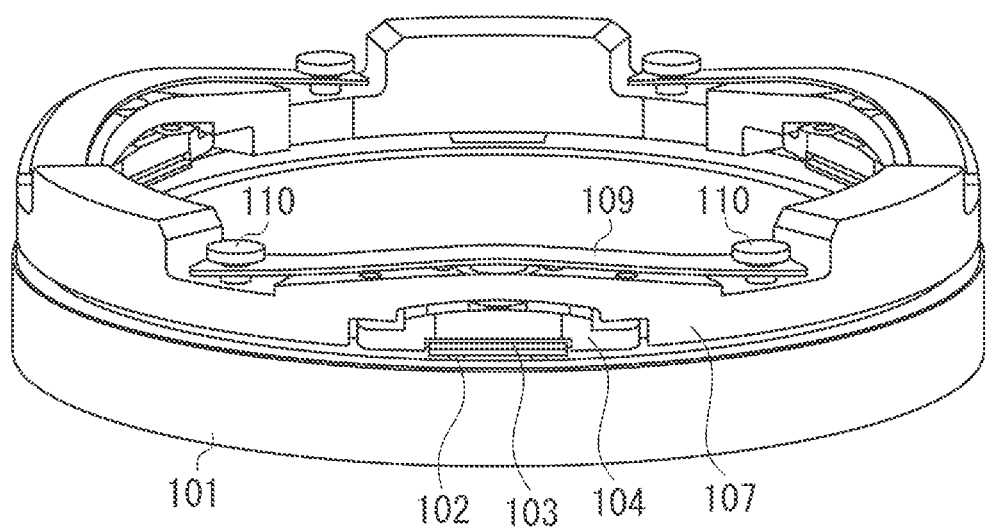
FIG. 1 is a perspective view illustrating an entire ultrasonic motor according to a first exemplary embodiment of the present invention.
Figure 2:
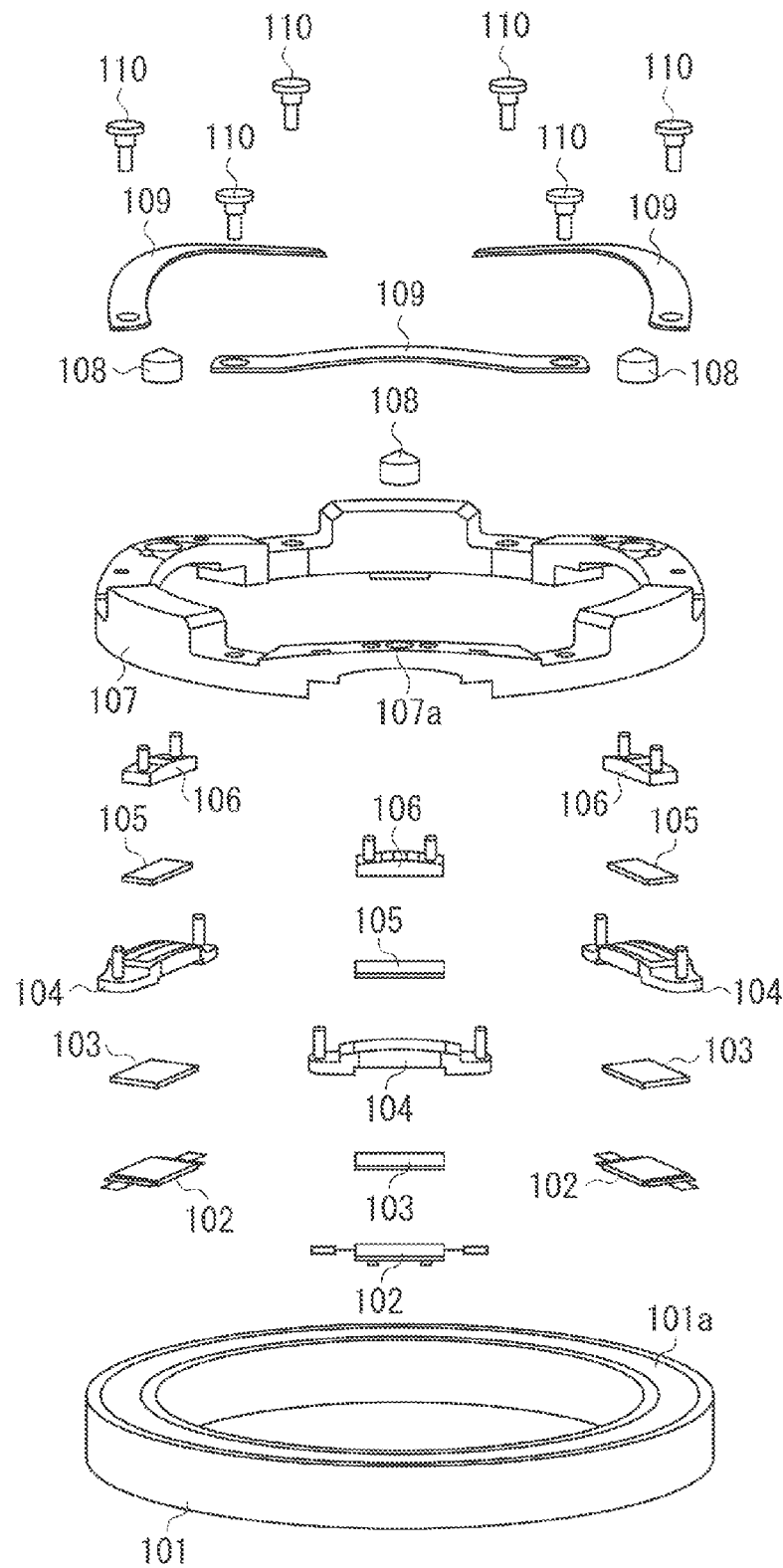
FIG. 2 is a perspective view illustrating the ultrasonic motor according to the first exemplary embodiment in an exploded state.

FIGS. 1 and 2 illustrate the ultrasonic motor according to the first exemplary embodiment of the present invention. FIG. 1 is a perspective view illustrating the entire ultrasonic motor. FIG. 2 is a perspective view illustrating the ultrasonic motor illustrated in FIG. 1 in an exploded state. In FIGS. 1 and 2, common members are indicated by same reference numerals.

A rotor 101 corresponds to a driven member in the present exemplary embodiment, and includes a contact surface 101a, which a vibrator that will be described below is in frictional contact with. A vibration plate 102 is held in a pressed state against the contact surface 101a in frictional contact with the contact surface 101a. A piezoelectric element 103 is pressure-bonded to the vibration plate 102 by, for example, an adhesive agent. An elliptical motion can be generated by application of a voltage in such a state that the vibration plate 102 and the piezoelectric element 103 are pressure-bonded to each other. The vibration plate 102 and the piezoelectric element 103 form the vibrator. In the present exemplary embodiment, the rotor 101 is rotationally driven by three sets of vibrators. In FIG. 1, only one set of vibrator is assigned reference numerals among the three sets of vibrators for simplification of illustration.

A first holding member 104 holds the vibrator to a ring member 107, which will be described below. A buffer 105 absorbs a vibration of the piezoelectric element 103, and is made of, for example, a felt. A second holding member 106 presses the vibrator against the rotor 101 via the buffer 105. The second holding member 106 is disposed within an opening portion 104b (FIG. 4A) formed at a central portion of the first holding member 104. The ring member 107 corresponds to a base in the present exemplary embodiment, and holds, for example, the first holding member 104, the second holding member 106, and a pressure shaft 108 and a plate spring 109, which will be described below.

The pressure shaft 108 is attached in a hole portion 107a of the ring member 107. The pressure shaft 108 is held movably only in a perpendicular direction to the contact surface 101a, and presses the vibrator against the contact surface 101a of the rotor 101 via the buffer 105 and the second holding member 106 by the plate spring 109, which will be described below. The plate spring 109 is fixed to the ring member 107 at both ends by two screws 110, and generates a pressing force. The pressure shaft 108 and the plate spring 109 correspond to a pressure unit.

In this way, the above-described respective members are assembled to be unitized as the ultrasonic motor. When the ultrasonic motor is installed in, for example, an actual lens barrel, the rotor 101 is driven while being connected with a focusing or zooming mechanism.

Figure 3:
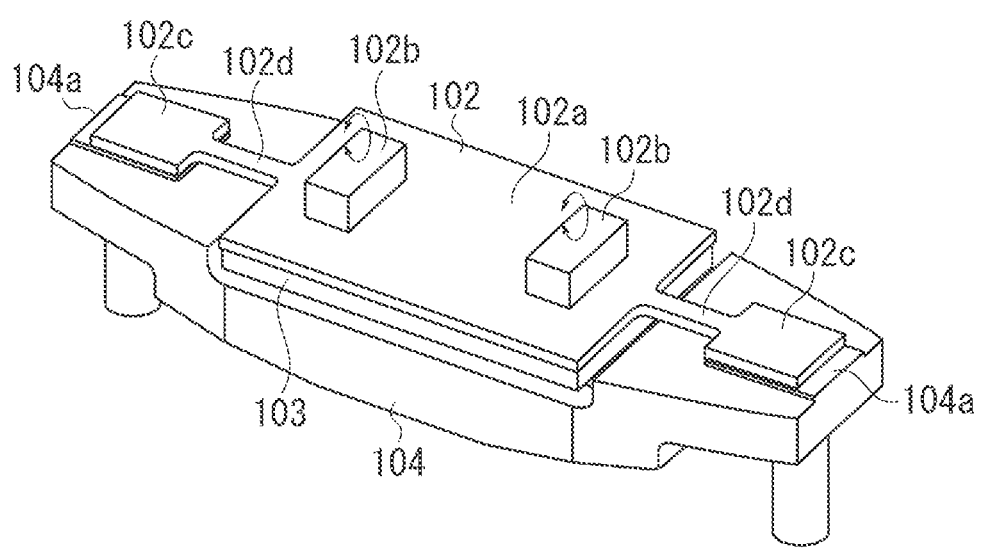
FIG. 3 is an enlarged perspective view illustrating how a vibration plate and a first holding member are coupled with each other according to the first exemplary embodiment.

Next, the component members of the ultrasonic motor will be described in detail. FIG. 3 is an enlarged perspective view illustrating how the vibration plate 102 and the first holding member 104 illustrated in FIGS. 1 and 2 are coupled with each other. FIG. 3 illustrates the vibration plate 102 and the first holding member 104 as viewed from the direction of the rotor 101, i.e., illustrating them upside down. Referring to FIG. 3, two protrusion portions 102b are formed at a central flat plate portion 102a of the vibration plate 102. Bottom surfaces of the protrusion portions 102b, i.e., two surfaces in contact with the contact surface 101a of the rotor 101 are formed in a same plane, and are finished as even surfaces by, for example, a polishing process at the time of manufacturing so as to improve a contact state with the contact surface 101a.

On the other hand, the piezoelectric element 103 is pressure-bonded to a back surface side of the flat plate portion 102a by, for example, an adhesive agent. This piezoelectric element 103 is constituted by a plurality of piezoelectric element films that are integrally laminated. Then, a desired alternating-current voltage is applied via a flexible printed board (not illustrated) joined to the piezoelectric element 103, thereby exciting two vibration modes at the vibration plate 102. At this time, elliptical vibrations are generated at the protrusion portions 102b as indicated by the arrows in FIG. 3 by setting the application of an alternating-current voltage in such a manner that a desired phase difference can be generated between the vibration phases of the two vibration modes. These elliptical vibrations are generated at the three vibrators as illustrated in FIGS. 1 and 2, and are transmitted to the contact surface 101a of the rotor 101, so that the rotor 101 can be rotationally driven. The details of the lamination structure and the vibration modes of the piezoelectric element 103 are similar to those discussed in Japanese Patent Application Laid-Open No. 2004-304887, so a detailed description thereof will be omitted herein.

Next, two joint portions 102c are formed near both ends of the vibration plate 102 to be joined to flat surface portions 104a, which are formed at both ends of the first holding member 104 and are raised by one stage. The vibration plate 102 is joined to the first holding member 104 at these joint portions 102c by, for example, welding or bonding.

Two arm portions 102d are formed between the two joint portions 102c and the flat plate portion 102a. The vibrator is fixed to the first holding member 104 via these arm portions 102d. As illustrated in FIG. 3, the arm portions 102d are shaped so as to be sufficiently narrowed relative to the flat plate portion 102a and the joint portions 102c, and are configured so as to hinder transmission of a vibration generated at the flat plate portion 102a to the joint portions 102c. In other words, the arm portions 102d serve to connect the first holding member 104 and the vibration plate 102 while preventing the first holding member 104 from interfering with a vibration generated at the flat plate portion 102a. The first holding member 104 includes the opening portion 104b (FIG. 4A) formed at a portion of the first holding member 104 opposite the piezoelectric element 103, and is configured so as to allow transmission of a pressing force by the second holding member 106 via the buffer 105. The details will be described with reference to the cross-sectional views illustrated in FIGS. 4A and 4B.

Figure 4A:
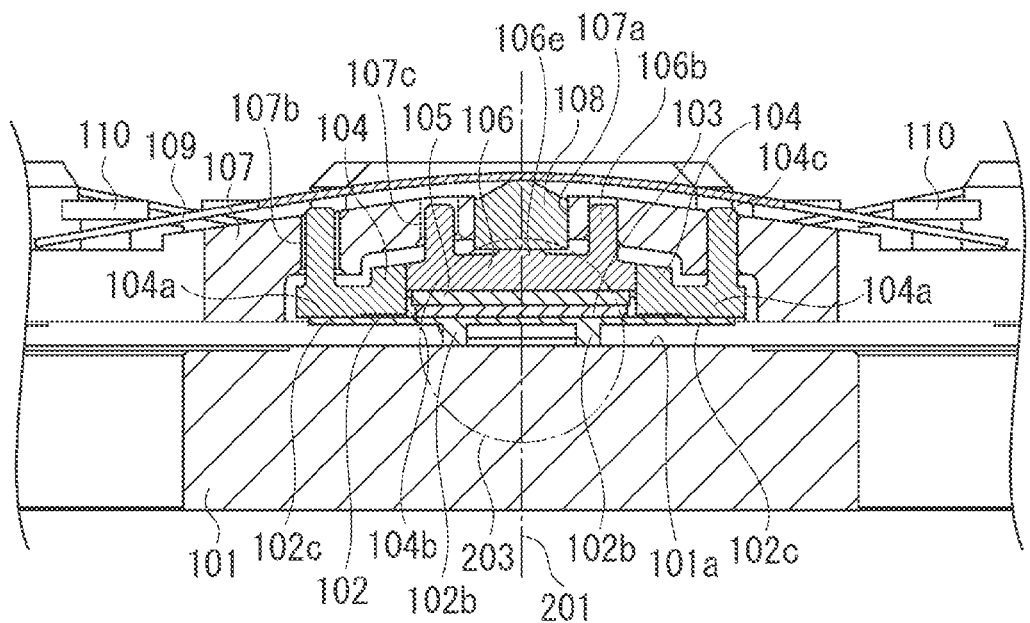
FIGS. 4A and 4B are enlarged cross-sectional views illustrating respective members according to the first exemplary embodiment in an assembled state.
Figure 4B:
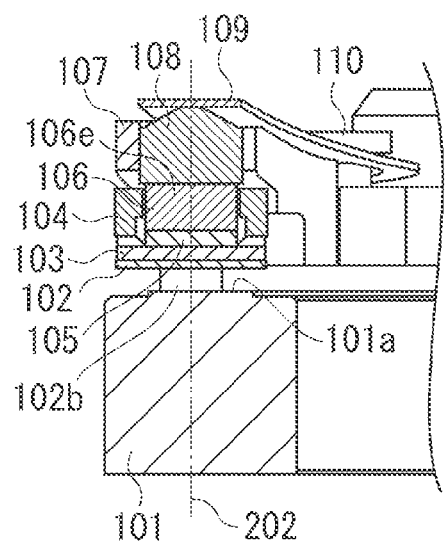

FIGS. 4A and 4B are enlarged cross-sectional views illustrating the respective members in an assembled state, and illustrating only one of the three vibrators in an enlarged manner. The remaining two vibrators are identically configured to the illustrated vibrator, and, therefore, a description thereof will not be repeated herein. FIG. 4A is a cross-sectional view taken along a plane including a line connecting centers of the two protrusion portions 102b of the vibration plate 102 illustrated in FIG. 3. FIG. 4B illustrates a cross-section perpendicular to the cross-section illustrated in FIG. 4A and passing through a center of the cross-section illustrated in FIG. 4A.

Referring to FIG. 4A, a central line 201 is located a same distance away from the two protrusion portions 102b of the vibration plate 102, and extends perpendicularly to the rotor 101. Further, referring to FIG. 4B, a central line 202 passes through a center between the protrusion portions 102b, and extends perpendicularly to the rotor 101.

The bottom surfaces of the protrusion portions 102b are in contact with the contact surface 101a of the rotor 101, and are in frictional contact with the contact surface 101a. The piezoelectric element 103 is bonded to the vibration plate 102. Further, the vibration plate 102 is joined to the first holding member 104 by the joint portions 102c on the both ends of the vibration plate 102 and the two flat plate portions 104a. Then, the opening portion 104b is formed near the center of the first holding member 104, and is located in such a manner that the buffer 105 and the second holding member 106 enter the opening portion 104b. Shaft portions 104c of the first holding member 104 and shaft portions 106b of the second holding member 106 are positioned by being respectively fitted in hole portions 107b and 107c of the ring member 107, so that each of the first holding member 104 and the second holding member 106 is configured so as to be movable in a direction of the central line 201. Therefore, the first holding member 104 and the second holding member 106 are configured so as to have a slight space formed therebetween, as illustrated in FIGS. 4A and 4B, preventing the first holding member 104 and the second holding member 106 from contacting each other.

A convex portion 106e, which is defined by a partial surface of a cylindrical shape shaped by pushing out a circle 203 illustrated in FIG. 4A in the backside direction of the sheet, is formed near a center at an upper side of the second holding member 106. Then, a flat surface portion at a lower end of the pressure shaft 108 is in contact with the convex portion 106e. Therefore, in FIG. 4A, the convex portion 106e and the pressure shaft 108 are in point contact with each other, so that the second holding member 106 and the pressure shaft 108 are configured so as to be inclinable to a rotation around a center of the circle 203. However, the shaft portions 106b of the second holding member 106 are positioned by being fitted in the hole portions 107c of the ring member 107, so that the second holding member 106 and the pressure shaft 108 are configured so as to be slightly inclinable within the range of a backlash in the fitting. In FIG. 4B, since the convex portion 106e is defined by a cylindrical surface, the convex portion 106e and the pressing shaft 108 are in line contact with each other, so that the second holding member 106 and the pressure shaft 108 are configured so as not to be inclinable in this direction.

Next, the pressure shaft 108 is fitted in the hole portion 107a formed near a center of the ring member 107, and is held movable only in the direction of the central line 201. The plate spring 109 is in contact with a convex portion at an upper side of the pressure shaft 108 in a pressed and deformed state. The plate spring 109 is fixed to the ring member 107 at the both ends by screws 110. Then, a pressing force due to the deformation of the plate spring 109 can be transmitted to the vibration plate 102 integrally bonded to the piezoelectric element 103 via the pressure shaft 108, the second holding member 106, and the buffer 105, thereby being applied to the rotor 101. The plate spring 109 is shaped so as to extend along a circular arc, and is made of a plate material as long and thin as possible, thereby having a small spring constant. As a result, it is possible to reduce a variation in the pressing force to a small degree even if an error occurs among parts.

In the present exemplary embodiment, the first holding member 104, which holds the vibration plate 102 while positioning it, and the second holding member 106, which holds the vibration plate 102 while pressing it, are separately provided, and are configured to be relatively movable only in the direction perpendicular to the rotor 101. Therefore, it is possible to press a portion near a center of an upper surface side of the vibration plate 102 via the piezoelectric element 103 and the buffer 105 while holding the vibration plate 102 near the both ends at the joint portions 102c, which is little influenced by a vibration of the vibration plate 102. Further, the present exemplary embodiment is configured in such a manner that, even when the piezoelectric element 103 or the buffer 105 has an individual difference in thickness, this difference can be absorbed by the movable mechanism of the second holding member 106, thereby improving the mass productivity. Further, even when a force is applied for reducing a distance between the rotor 101 and the ring member 107 due to a drop accident or impact, this force can be absorbed by the movable mechanisms of the first holding member 104 and the second holding member 106, thereby avoiding application of a destructive force to the vibration plate 102 to prevent a breakage. Further, such a force can be directly received by the second holding member 106 via the buffer 105, thereby preventing the vibration plate 102 and the piezoelectric element 103 from being broken.

In the present exemplary embodiment, the first holding member 104 and the second holding member 106 are made of, for example, a plastic resin. Especially, the first holding member 104 is made of a material that has a higher damping capability against a vibration, since the first holding member 104 is directly joined to the vibration plate 102.

Generally, a highly rigid material, such as a metal, has a low damping capability against a vibration. On the other hand, a less rigid material, such as rubber, has a high damping capability against a vibration, and, therefore, can stop a vibration more quickly. However, in recent years, various kinds of materials have been developed as plastic resins that have a high damping capability against a vibration while maintaining the rigidity. On the other hand, during an ultrasonic vibration, surrounding components holding the vibrator may generate audible abnormal noises by being influenced by the vibration.

However, in the present exemplary embodiment, the above-described material that has a high damping capability is used for the first holding member 104, so that the first holding member 104 can absorb a vibration transmitted from the vibration plate 102. Therefore, it is possible to prevent the first holding member 104 itself from becoming a source of generating abnormal noises. Further, a vibration is not transmitted to the other members, such as the coupled ring member 107, so that the first holding member 104 can prevent the other members from becoming a source of generating abnormal noises.

The second holding member 106 is in contact with the piezoelectric element 103 via the buffer 105 capable of extremely large absorption of a vibration, so that most of vibrations are damped within the buffer 105, and a vibration transmitted to the second holding member 106 is little. Therefore, the second holding member 106 is made of a material that has a higher strength, since the second holding member 106 is configured to directly receive the pressing force.

According to the present exemplary embodiment configured as mentioned above, it is possible to stably press the vibrator against the driven member with a low-cost and simple structure without requiring a complicated adjustment mechanism and a positioning mechanism like the conventional example.

Figure 5:
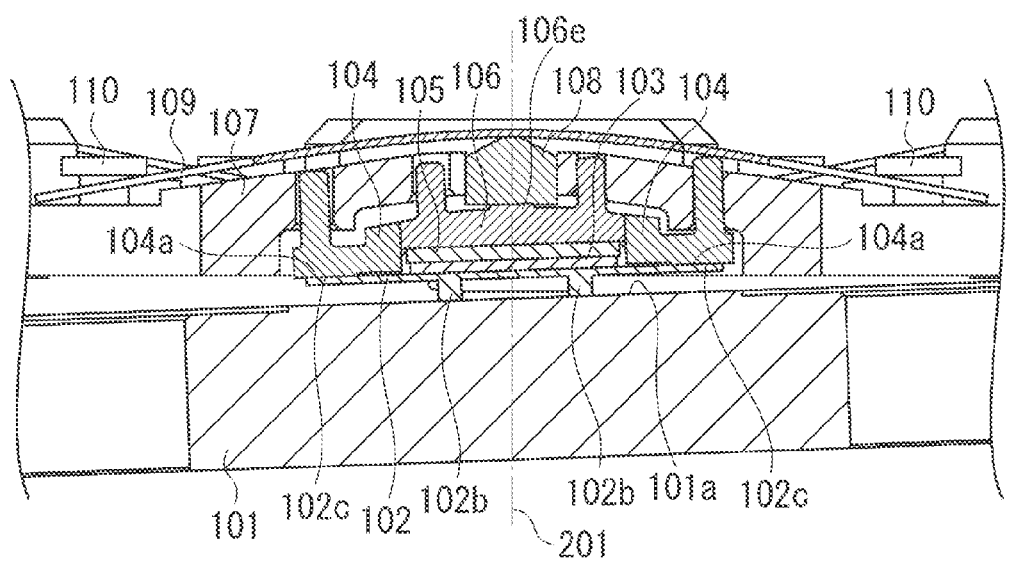
FIG. 5 is an enlarged cross-sectional view illustrating the ultrasonic motor according to the first exemplary embodiment when a rotor inclines.

FIG. 5 is a cross-sectional view corresponding to FIG. 4A, and illustrates the ultrasonic motor when the rotor 101 inclines. In FIG. 5, the protrusion portions 102b of the vibration plate 102 follow the contact surface 101a of the rotor 101, and can maintain the frictional contact state with the rotor 101.

At this time, the vibrator including the vibration plate 102 and the piezoelectric element 103 inclines according to the inclination of the rotor 101, which causes the first holding member 104 coupled to the vibrator to incline. Further, the second holding member 106 follows the inclination of the vibrator to incline via the buffer 105 by rotating around a center of the cylindrical shape of the convex portion 106e defined by a cylindrical surface.

Therefore, even when an inclination occurs due to a dimension error or an assembly error in the respective parts, or, even when an inclination occurs due to a vibration or a disturbance at the time of driving, it is possible to maintain the stable frictional contact state at the two protrusion portions 102b. In other words, it is possible to improve equalization of the vibrator to the rotor 101. In the illustration of FIG. 5, the inclination is illustrated with an exaggerated inclination amount for facilitating better understanding of the inclining state. An actual inclination amount is only an amount corresponding to a backlash in the fitting of the first holding member 104 and the second holding member 106 in the ring member 107.

In this way, the present exemplary embodiment is configured in such a manner that the first holding member 104 and the second holding member 106, which hold the vibration plate 102, are separately provided, whereby it is possible to stably press the vibrator against the driven member with a simple structure.

The present exemplary embodiment is configured in such a manner that a large area near a center of the piezoelectric element 103 is pressed via the buffer 105, but the present exemplary embodiment may be configured in such a manner that a protrusion is provided only at a portion of the second holding member 106 that corresponds to a node of a vibration, thereby pressing only a portion of the piezoelectric element 103 near the node. In this case, it is possible to further prevent the second holding member 106 from interfering with a vibration of the piezoelectric element 103, so that power consumption may be reduced. Further, the present exemplary embodiment is configured in such a manner that the first holding member 104 and the second holding member 106 are made of a plastic resin selected in consideration of the strength and vibration damping capability. However, even in a case where a further highly rigid material, such as a metal, is used for each of the first holding member 104 and the second holding member 106, it is also possible to reduce generation of abnormal noises due to a vibration by carrying out an improvement in form to optimize the thickness of the member, the length of the member, and the shape of the member in cross section, and arranging the respective components so as not to have a resonance point near the driving frequency of the vibrator.

Further, the first exemplary embodiment has been described based on an example of rotational driving, but is not limited thereto. For example, the first exemplary embodiment can be also applied to linear driving.

In the following description, a second exemplary embodiment will be described. The second exemplary embodiment is a variation of the first exemplary embodiment, and is an example in which the shaft portions 106b of the second holding member 106 fitted in the hole portions 107c of the ring member 107 are removed from the first exemplary embodiment.

Figure 6A:
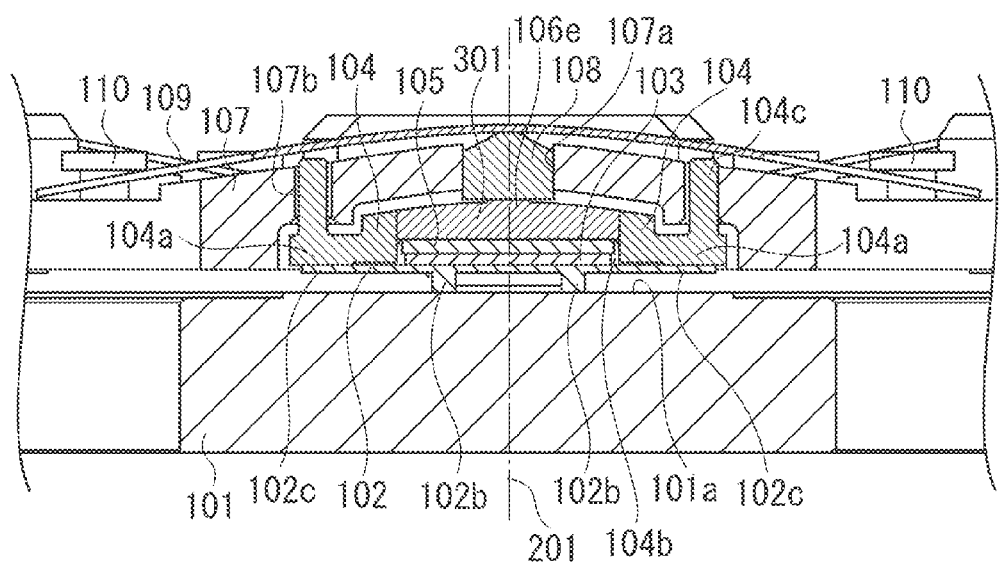
FIGS. 6A and 6B are enlarged cross-sectional views illustrating respective members according to a second exemplary embodiment of the present invention in an assembled state.
Figure 6B:
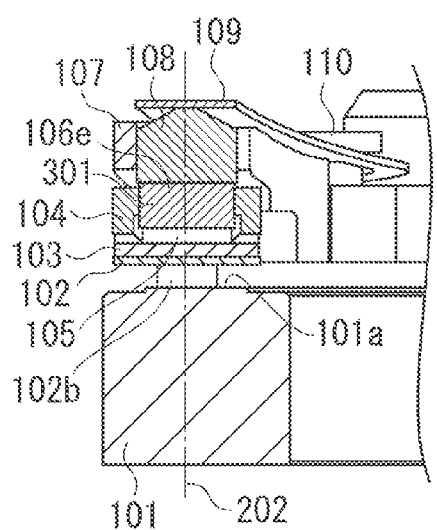

FIGS. 6A and 6B are enlarged cross-sectional views illustrating respective members in an assembled state. FIGS. 6A and 6B correspond to FIGS. 4A and 4B, respectively. In FIGS. 6A and 6B, similar members to the first exemplary embodiment are indicated by the same reference numerals, and a detailed description of the members will not be repeated below. Referring to FIG. 6A, a second holding member 301 is disposed so as to be fitted in the opening portion 104b formed near the center of the first holding member 104, and is configured so as to be movable only in the direction along the central lines 201 and 202. The other components are similar to the first exemplary embodiment, and are configured so as to be inclinable to an inclination of the rotor 101.

The second holding member 301 does not have the shaft portions and, therefore, is more simply structured compared to the first exemplary embodiment. This structural simplification improves the mass-productivity in manufacturing, and makes it possible to select not only a plastic resin but also any one from a wide range of materials including a metal and a ceramic as the material of the second holding member 301.

Further, when the rotor 101 inclines as illustrated in FIG. 5, the first exemplary embodiment is configured in such a manner that the first holding member 104 and the second holding member 106 separately incline via the vibrator. However, according to the second exemplary embodiment, due to the fitted engagement of the second holding member 301 in the first holding member 104, the second holding member 301 can incline according to an inclination of the first holding member 104, thereby allowing the first holding member 104 and the second holding member 301 to integrally incline with each other.

<Lens Barrel>

Figure 7:
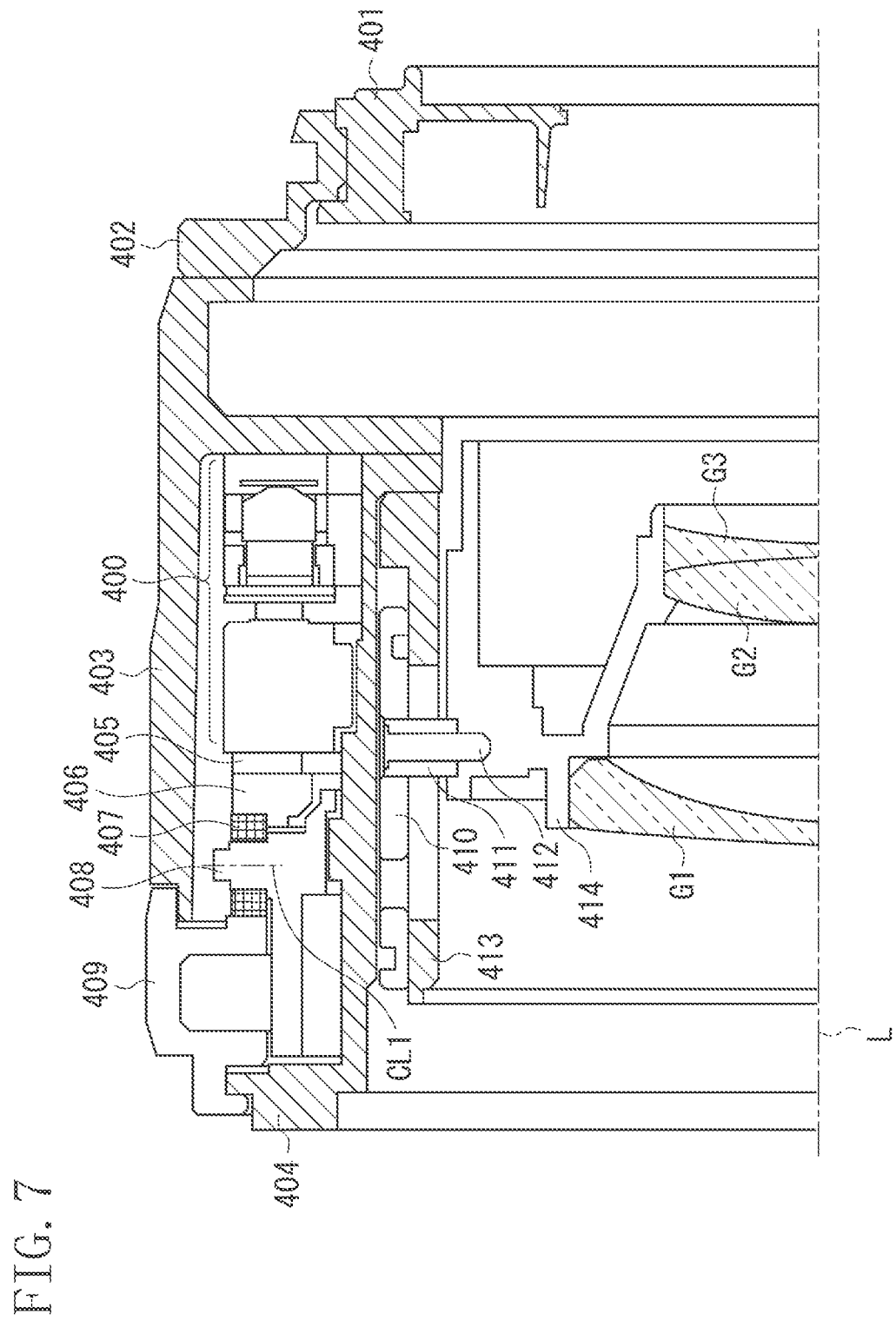
FIG. 7 illustrates across section when the ultrasonic motor is installed in a lens barrel.

FIG. 7 illustrates a cross section when the ultrasonic motor illustrated in, for example, FIGS. 1 and 2 is installed in a lens barrel as an ultrasonic motor 400. The ultrasonic motor 400 is disposed as an actuator for driving focus lens groups in the lens barrel. The lens barrel is substantially rotationally symmetric, whereby FIG. 7 illustrates only an upper half of the configuration. Further, FIG. 7 does not illustrate lenses other than focus lens groups G1, G2, and G3, and the lens barrel for simplification of illustration. Further, the lens barrel illustrated in FIG. 7 is a lens barrel detachably attachable to an interchangeable lens type camera.

Referring to FIG. 7, a line L indicates an optical axis of the lens barrel. The ultrasonic motor 400 includes a rotor unit at the left side, which is rotatable around the optical axis L, and a stator unit at the right side. Stationary barrels 401, 402, 403, and 404 are coupled by, for example, not-illustrated screws. The stationary barrel 403 holds the stator unit of the ultrasonic motor 400, and the stationary barrel 404 holds the rotor unit of the ultrasonic motor 400 in a rotatable state.

A buffer 405 is fixed to the rotor unit of the ultrasonic motor 400, and rotates integrally with the rotor unit. A rotational member 406 also rotates integrally with the rotor unit and the buffer 405. A rotational roller 407, which is rotatable around a central line CL1, is in contact with the rotational member 406, which rotates integrally with the rotor unit. A rotational roller holding member 408 is a member that rotatably holds the rotational roller 407, and that is rotatable around the optical axis L. A focus adjustment member 409, which a photographer can directly operate, is rotatable around the optical axis L.

A cam barrel 410, which includes a cam groove formed thereon, is coupled with the rotational roller holding member 408 via a groove portion (not illustrated) formed on the stationary barrel 404, and simultaneously rotates around the optical axis L. A shaft member 411 engaged with the cam groove of the cam barrel 410 is fixed to a focus lens barrel 414, which will be described below, by a screw 412. A stationary barrel 413, which includes a straight line groove formed thereon, is fixed to the stationary barrel 404. Further, the stationary barrel 413 is engaged with the shaft member 411 at the straight line groove, and the shaft member 411 linearly moves along the straight line groove according to a rotational movement of the cam barrel 410.

The focus lens barrel 414, which holds the focus lens groups G1, G2, and G3, is disposed so as to be movable in a straight line relative to the stationary barrel 413 by the shaft member 411. In FIG. 7, the focus lens barrel 414 is held only by a single shaft member, i.e., the shaft member 411, but, actually, the focus lens barrel 414 is held by three or more shaft members approximately evenly spaced apart from one another.

In the above-described configuration, when the rotor unit of the ultrasonic motor 400 rotates, the rotational member 406 also rotates integrally therewith, and the rotational roller 407 rolls accordingly. At this time, the focus adjustment member 409 is motionless due to friction with the stationary barrels 403 and 404. Then, according to the rolling motion of the rotational roller 407, the rotational roller holding member 408 rotates around the optical axis L, and then the focus lens barrel 414 moves in a straight line via the cam barrel 410 and the stationary barrel 413.

On the other hand, when the focus adjustment member 409 is operated, the rotor unit of the ultrasonic motor 400 is motionless due to friction, and, therefore, the rotational member 406, which integrally follows the rotor unit, is also motionless. Then, a rolling motion of the rotational roller 407 allows the focus lens barrel 414 to move in a straight line in a similar manner to the operation when the rotor unit of the ultrasonic motor 400 rotates.

The configuration has been described above based on an example in which the ultrasonic motor is installed in the lens barrel. In this regard, the lens barrel may be a lens barrel traded alone in a market separately from an apparatus including a charge-coupled device (CCD) sensor or a complementary metal-oxide semiconductor (CMOS) sensor, or may be a lens barrel installed in an apparatus including a CCD or CMOS sensor, and traded integrally with the apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-017136 filed Jan. 30, 2012, which is hereby incorporated by reference herein in its entirety.

What is claimed is:

1. A motor comprising:
a vibrator configured to generate a vibration;
a relatively movable member configured to be movable by the vibrator, wherein the relatively movable member is movable relatively according to the vibration of the vibrator;
a holding unit configured to hold the vibrator; and
a pressure unit configured to press the vibrator against the relatively movable member,
wherein the holding unit includes a first holding member configured to hold the vibrator, and a second holding member configured to press the vibrator against the relatively movable member, and
wherein the second holding member is relatively movable in relation to the first holding member in a direction perpendicular to a contact surface of the relatively movable member with the vibrator.

2. The motor according to claim 1, wherein the first holding member holds the vibrator near both ends of the vibrator, and the second holding member holds the vibrator near a center of the vibrator.

3. The motor according to claim 1, wherein the first holding member includes an opening portion, and the second holding member is disposed in the opening portion.

4. The motor according to claim 1, wherein the first holding member is made of a material that has a higher damping capability against the vibration of the vibrator than that of the second holding member.

5. The motor according to claim 4, wherein the second holding member is made of a material that has a higher strength than that of the first holding member.

6. The motor according to claim 1, further comprising a base configured to hold the first holding member, the second holding member, and the pressure unit,
wherein the first holding member and the second holding member are inclinable to the base.

7. The motor according to claim 1, wherein the vibration generated by the vibrator is an elliptical vibration.

8. A lens unit comprising, a lens member which is driven by the motor of claim 1.

9. A motor comprising:
a vibrator configured to generate a vibration;
a relatively movable member configured to be movable by the vibrator, wherein the relatively movable member is movable relatively according to the vibration of the vibrator;
a holding unit configured to hold the vibrator; and
a pressure unit configured to press the vibrator against the relatively movable member,
wherein the holding unit includes a first holding member configured to hold the vibrator, and a second holding member configured to press the vibrator against the relatively movable member, and
wherein the first holding member is able to incline relative to a contact surface of the relatively movable member with the vibrator and the second holding member is relatively movable in the direction perpendicular to the contact surface of the relatively movable member with the vibrator.

10. The motor according to claim 9, wherein the first holding member holds the vibrator near both ends of the vibrator, and the second holding member holds the vibrator near a center of the vibrator.

11. The motor according to claim 9, wherein the first holding member includes an opening portion, and the second holding member is disposed in the opening portion.

12. The motor according to claim 9, wherein the first holding member is made of a material that has a higher damping capability against the vibration of the vibrator than that of the second holding member.

13. The motor according to claim 12, wherein the second holding member is made of a material that has a higher strength than that of the first holding member.

14. The motor according to claim 9, further comprising a base configured to hold the first holding member, the second holding member, and the pressure unit, wherein the first holding member and the second holding member are inclinable to the base.

15. The motor according to claim 9, wherein the vibration generated by the vibrator is an elliptical vibration.

16. A lens unit comprising, a lens member which is driven by the motor of claim 9.

17. The motor according to claim 1, wherein the first holding member is movable in a direction perpendicular to a contact surface of the relatively movable member with the vibrator.

18. The motor according to claim 1, wherein the first holding member is movable in a direction perpendicular to a contact surface of the relatively movable member with the vibrator.

* * * * *